Patented Apr. 10, 1945

UNITED STATES PATENT OFFICE 2,373,290

2,373,290
METHOD FOR STABILIZING ROSIN

William P. Campbell, Newark, Del., assignor to Hercules Powder Company, Wilmington, Del., a corporation of Delaware No Drawing. Application May 27, 1944, Serial No. 537,735

6 Claims. (Cl. 260—100)

This invention relates to a method for stabilizing modified rosins; more particularly, it relates to a method of decreasing the apparent unsaturation of modified rosins containing dihydroresin acids.

Natural rosins or resin acids have been modified by a number of different methods, such as hydrogenation, disproportionation, dehydrogenation, etc. By such modifications, the original rosin acids have become transformed in part to dihydroresin acids. While such modified rosins have possessed a lower degree of unsaturation, their stability against oxidation and subsequent deterioration has not been as high as would be desired.

Now, in accordance with this invention, a method has been found for decreasing the apparent unsaturation of a modified rosin containing at least 10% dihydroresin acids which comprises contacting said modified rosin with an organic sulfonic acid in the presence of formic acid or acetic acid at an elevated temperature, and thereafter separating the substantially stable resinous product from the mixture.

Having now indicated in a general way the nature and purpose of this invention, there follows a more detailed description of the invention in the form of examples. All parts expressed in the examples represent parts by weight unless otherwise specified.

Example I

Four hundred parts of disproportionated rosin, prepared by agitating N wood rosin with 6.7% by weight of a palladium catalyst supported on activated carbon in the absence of hydrogen at 240° C. for 1 hour containing approximately 17% dihydroresin acids and having a bromine number of 61 and an acid number of 174, were added to 2300 parts of acetic acid containing 40 parts of p-toluenesulfonic acid. This mixture was refluxed at a temperature range of about 115° to 120° C. for 60 hours. Part of the solvent was then removed by distillation and the residual mixture was poured into water. The precipitated product was taken up in diethyl ether and the solution washed three times with a 1% solution of sodium bicarbonate in 1:4 ethanol-water mixture, followed by two water washings. The ether solution was dried over anhydrous sodium sulfate, filtered, and distilled. The yield of the more stabilized product was 390 parts, having an acid number of 147 and a bromine number of 23.

Example II

A solution of 250 parts of disproportionated rosin, prepared as given in Example I, having an acid number of 150 and a bromine number of 46, in 2000 parts of glacial acetic acid and 200 parts of water containing 200 parts of p-toluenesulfonic acid was refluxed at a temperature of about 105° to 115° C. for a period of 48 hours. The more stabilized product was isolated as in Example I. The yield was 246 parts, having an acid number of 119 and a bromine number of 11.

Example III

One hundred parts of a heat-treated polymerized rosin of 100° C. drop melting point containing approximately 14% dihydroresin acids, having a bromine number of 99 and an acid number of 150 were added to 730 parts of formic acid containing 80 parts of benzenesulfonic acid. This mixture was refluxed at a temperature range of about 100° to 110° C. for 48 hours. The more stabilized product was isolated as in Example I and characterized by having an acid number of 85 and a bromine number of 43. The heat-treated polymerized rosin used was obtained by polymerizing N wood rosin with sulfuric acid and then heating the polymerized product at 250° C. for 30 minutes.

Example IV

One hundred parts of heat-treated wood rosin of specific rotation of +15, containing approximately 24% dihydroresin acids, having a bromine number of 101 and an acid number of 147 were added to 730 parts of formic acid containing 80 parts of benzenesulfonic acid. This mixture was refluxed at a temperature range of about 100° to 110° C. for 50 hours. The product of improved stability was isolated as in Example I. It had an acid number of 86 and a bromine number of 55.

The above examples illustrate the preparation of treated rosin products which are substantially more resistant to reagents that attack ethylenic double bonds than the original modified rosin.

The modified rosins containing at least 10%, and preferably in the range of 10 to 90% dihydroresin acids which have been found useful in the process of this invention are, for example, dehydrogenated rosin, hydrogenated rosin, disproportionated rosin, heat-treated rosin, heat-treated polymerized rosin, etc. The dehydrogenated rosin employed in accordance with the method of this invention may be prepared by the hydrogenation-dehydrogenation or disproportionation procedures. In such procedures, the rosin is treated in the presence of a dehydrogenation or disproportionation catalyst, such as iodine, or an active hydrogenation catalyst, such as base metal catalysts, noble metal catalysts, etc., for a period of time sufficient to form disproportionated rosin containing at least 10% of dihydroresin acids. The hydrogenated rosin useful in the process of this invention may be any rosin which has been subjected to hydrogenation with base metal or noble metal catalysts to effect a saturation of the ethylenic double bonds sufficient to provide a modified rosin containing from 10 to 90% of dihydroresin acids. Preferably, the hydrogenation is carried out to effect a saturation of at least 50% of the ethylenic double bonds. The disproportionated rosin useful in the process herein may be the "Hyex" rosin prepared in general by contacting rosin with an active hydrogenation catalyst in the absence of added hydrogen by the process disclosed in U. S. Patent No. 2,154,629. The heat-treated rosins may be any rosin which has been treated at a temperature from about 250° to about 350° C. for a sufficient period of time to effect a substantial amount of isomerization or intramolecular rearrangement with formation of a modified rosin containing at least 10% of dihydroresin acids.

As to the organic sulfonic acids that are useful as catalysts in carrying out the method of this invention, any true organic sulfonic acid may be employed, such as p-toluenesulfonic acid, benzenesulfonic acid, xylene mono- or di-sulfonic acids, naphthalene mono- or di-sulfonic acids, n-butylsulfonic acid, isoamylsulfonic acid, isopropylsulfonic acid, n-propylsulfonic acid, n-amylsulfonic acid, etc. The amount of organic sulfonic acid catalyst may vary over a wide range, such as from about 1 to about 100% of the weight of the rosin. A preferred range, however, is from about 5 to about 50% of the weight of the rosin.

The mutual solvents employed in carrying out the method of this invention; namely, formic and acetic acids, may be used in their substantially anhydrous state or may contain an amount of water not to exceed about 10%. A small amount of water in the acetic or formic acid is usually desirable to facilitate the solution of the organic sulfonic acid. The terms "acetic acid" and "formic acid" used herein will be understood to include the nearly anhydrous acids or those containing water in amounts not to exceed 10%.

The temperature range employed in effecting the decrease in the unsaturation of the aforementioned modified rosins when said rosin, catalyst acid, and solvent are heated, may vary from about 60° to about 180° C. The temperature employed will, in general, depend upon the constitution of the mixture to be heated. More specifically, a temperature within the range from about 95° to about 130° C. will be preferable. Where the temperature employed is above the boiling point of the mixture, superatmospheric pressure may be used.

The period of time over which the reaction mixture is to be heated to effect a substantial reduction in the degree of unsaturation of a given modified rosin is dependent upon a number of factors, such as the temperature, concentration of the reactants, etc., but predominantly upon the strength of the organic sulfonic acid. In general, the time of treatment may be from about 8 to about 100 hours.

The crude, more stabilized modified rosin product may be taken up in solvents other than the diethyl ether used in the examples. As solvents for recovering the product besides ether, there may be used certain paraffin hydrocarbons, such as petroleum ether, "Skellysolve," etc.; chlorinated paraffin hydrocarbons, such as ethylene dichloride, carbon tetrachloride, etc. The solution of the resinous product may be dried over anhydrous calcium chloride, anhydrous calcium sulfate, or in any other manner. Alternatively, a less pure resinous product may be separated without drying the solution by simply evaporating the solvent.

Thus, in accordance with the process of this invention, it is possible to prepare improved resinous products from modified rosins which are substantially more stable towards reagents that attack double bonds. The improved products prepared according to the process of this invention are very desirable in protective coating compositions, such as lacquers, varnishes, etc. They also may serve for the preparation of emulsifying and wetting agents, esters, resins, etc.

What I claim and desire to protect by Letters Patent is:

1. A process for decreasing the apparent unsaturation of a modified rosin containing at least 10% dihydroresin acids which comprises contacting said rosin in the absence of hydrogen with an organic sulfonic acid in the presence of an aliphatic acid selected from the group consisting of formic acid and acetic acid at a temperature in the range from about 60° to about 180° C., and thereafter separating a substantially stable resinous product from the reaction mixture.

2. A process for decreasing the apparent unsaturation of a modified rosin containing at least 10% dihydroresin acids which comprises contacting said rosin in the absence of hydrogen with an organic sulfonic acid in the presence of an aliphatic acid selected from the group consisting of formic acid and acetic acid at a temperature in the range from about 95° to about 130° C., and thereafter separating a substantially stable resinous product from the reaction mixture.

3. A process for decreasing the apparent unsaturation of a modified rosin containing at least 10% dihydroresin acids which comprises contacting said rosin in the absence of hydrogen with an organic sulfonic acid in the presence of acetic acid at a temperature in the range from about 60° to about 180° C., and thereafter separating a substantially stable resinous product from the reaction mixture.

4. A process for decreasing the apparent unsaturation of a modified rosin containing at least 10% dihydroresin acids which comprises contacting said rosin in the absence of hydrogen with p-toluenesulfonic acid in the presence of acetic acid at a temperature in the range from about 95° to about 130° C., and thereafter separating a substantially stable resinous product from the reaction mixture.

5. A process for decreasing the apparent unsaturation of a modified rosin containing at least 10% dihydroresin acids which comprises contacting said rosin in the absence of hydrogen with benzenesulfonic acid in the presence of formic acid at a temperature in the range from about 95° to about 130° C., and thereafter separating a substantially stable resinous product from the reaction mixture.

6. A process for decreasing the apparent unsaturation of a modified rosin containing at least 10% dihydroresin acids which comprises contacting said rosin in the absence of hydrogen with naphthalene disulfonic acid in the presence of acetic acid at a temperature in the range from about 95° to about 130° C., and thereafter separating a substantially stable resinous product from the reaction mixture.

WILLIAM P. CAMPBELL.